Dec. 22, 1964  R. W. LEWIS  3,161,895
RETRACTABLE HATCH AND WINDSHIELD COMBINATION FOR BOATS
Filed Jan. 31, 1963  3 Sheets-Sheet 1
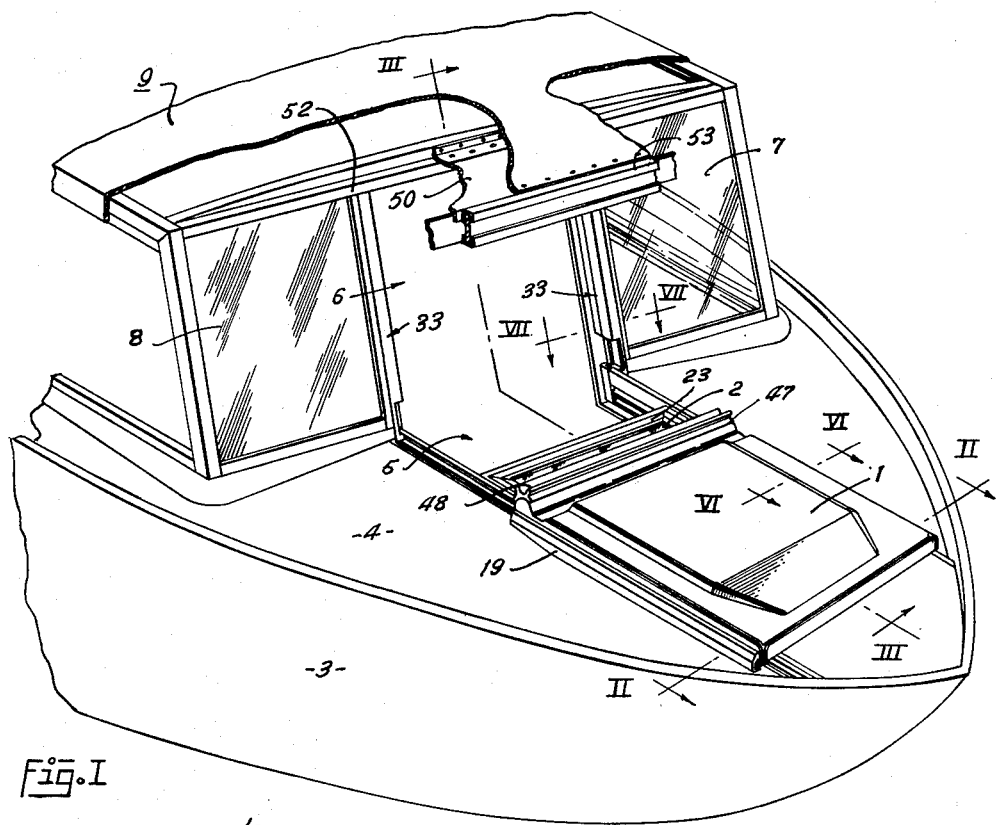
Fig. I
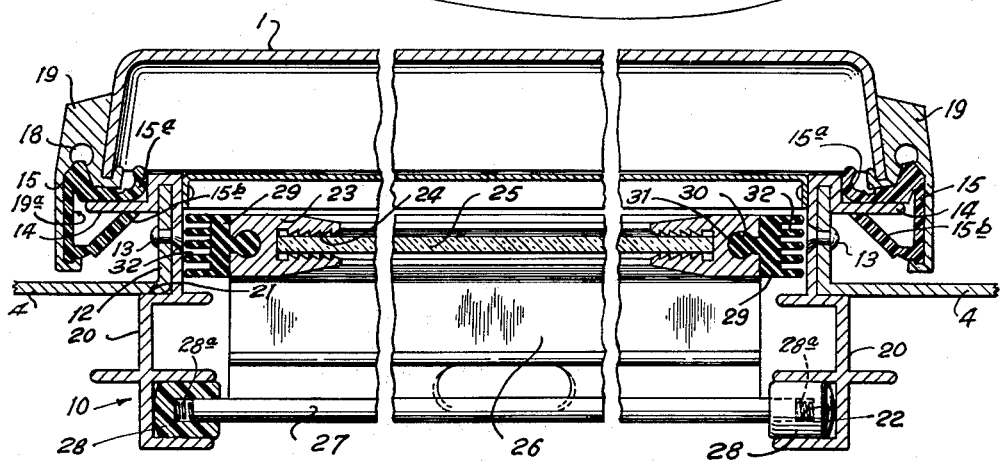
Fig. II
INVENTOR
Roy W. Lewis
BY Howard E. Moore
ATTORNEY

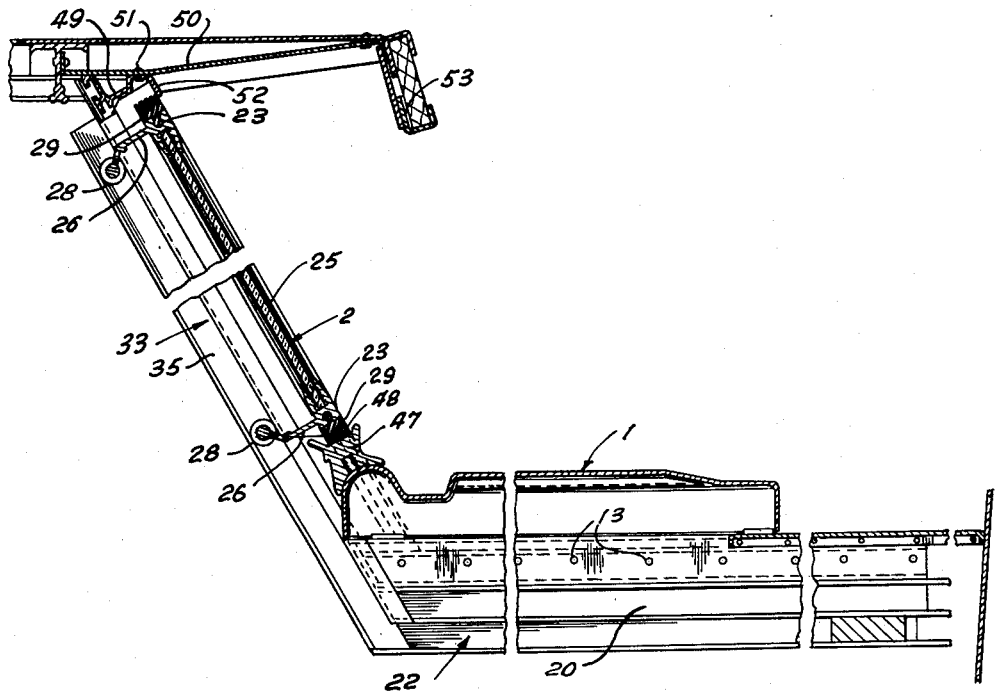
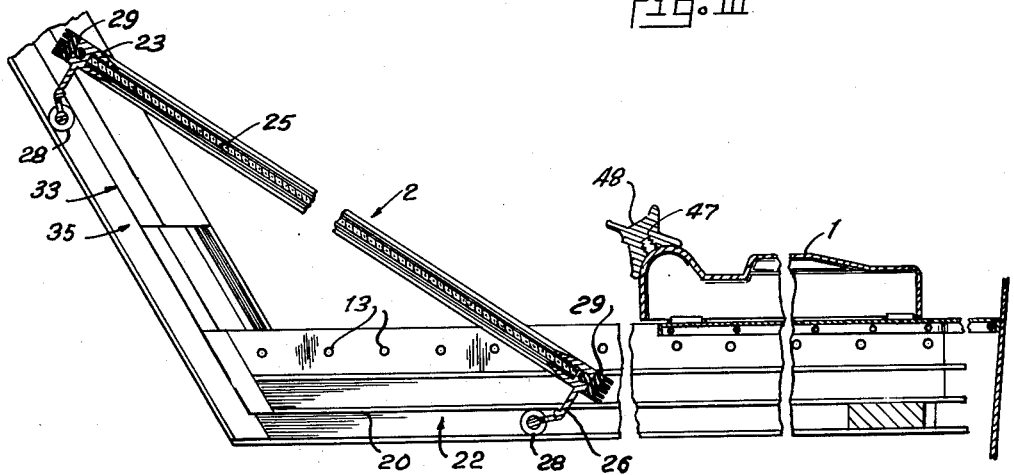

Dec. 22, 1964 R. W. LEWIS 3,161,895
RETRACTABLE HATCH AND WINDSHIELD COMBINATION FOR BOATS
Filed Jan. 31, 1963 3 Sheets-Sheet 3
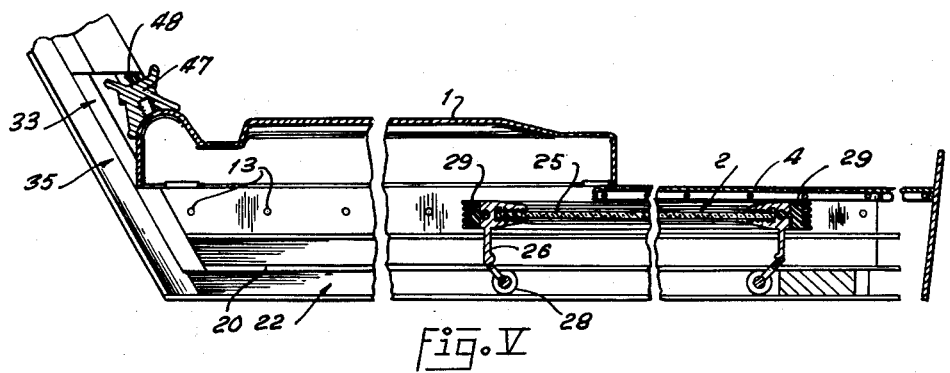
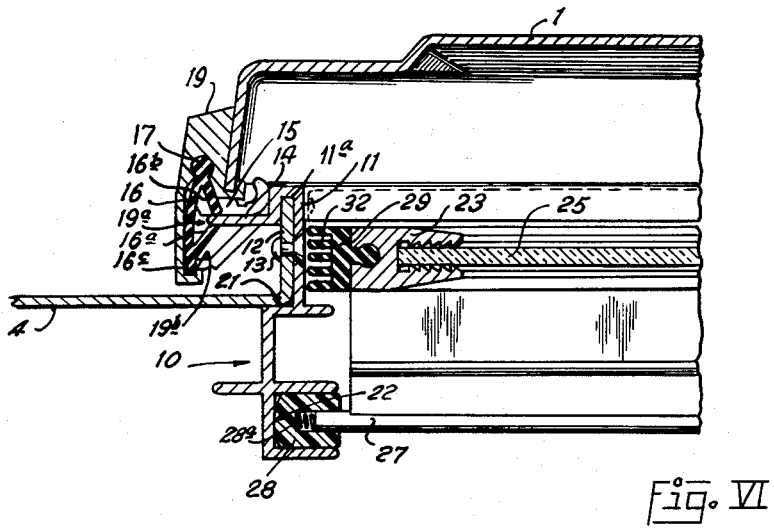
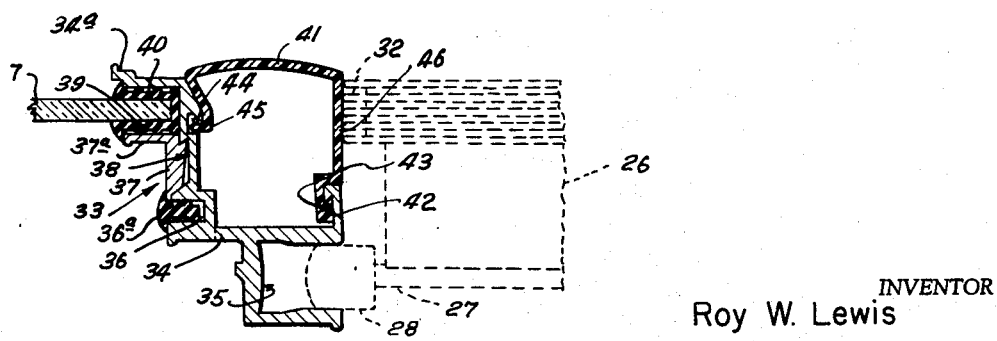
INVENTOR
Roy W. Lewis
BY Howard E. Moore
ATTORNEY

United States Patent Office 3,161,895
Patented Dec. 22, 1964

3,161,895
RETRACTABLE HATCH AND WINDSHIELD
COMBINATION FOR BOATS
Roy W. Lewis, Plano, Tex., assignor to Lone Star Boat
Company, Plano, Tex., a corporation of Texas
Filed Jan. 31, 1963, Ser. No. 255,251
7 Claims. (Cl. 9—1)

This invention has to do with boats, primarily pleasure boats, and is particularly concerned with a retractable hatch cover and windshield section especially adapted to be used on a cabin type of pleasure boat, whereby the hatch may be slid forwardly along the hatch way opening, and the mid-section of the front windshield may be slid downwardly and underneath the hatch cover, to provide a stand-up walkway from the interior of the cabin into the hatchway to thereby permit the occupant to gain access to the front of the boat for anchoring or tying up same.

It is desirable to have a hatch in the deck of the forward portion of a cabin type of pleasure boat, so that access may be had to the anchor at the front of the boat, and to the cleat or other member on the forward part of the deck for tying the boat up to a dock or other place.

Heretofore a removable or hinged hatch cover has been provided over an opening in the deck, and it was necessary for the operator of the boat to crawl underneath the deck and raise up through the hatch opening as the cover was removed to perform the above described operation.

The improvement contemplated by this invention is a hatch cover which is slidably mounted to a longitudinal hatchway extending through the forward deck, and forwardly thereof, and a section of windshield slidably attached in a vertical opening between the fixed windshields at the front of the cabin, which opening is in alignment with the hatchway, whereby the hatch cover may be slid forwardly, and the windshield section slid downwardly underneath the hatch cover, to provide a stand-up walkway opening through the windshield and into the hatchway, for the purposes hereinbefore mentioned.

It is, therefore, a primary object of this invention to provide in a boat having a cabin, with a deck extending forwardly, a hatchway opening in the deck extending forwardly of an upright windshield, with a windshield opening coinciding and communicating therewith and having a hatch cover slidably positioned in the hatchway and a windshield section slidably positioned in the windshield opening, whereby the hatch cover may be slid forwardly of the hatchway, and the windshield section may be slid downwardly and forwardly underneath the hatch cover, to provide a full open walkway space through the windshield area and into the hatchway.

Another object of the invention is to provide a unique slidable windshield section in the aforementioned combination, having rollers thereon rotatably positioned in channels on each side of the windshield opening, and having seal members thereabout which sealingly engage the inner side of the windshield opening when the windshield is raised to thereby seal the opening against the entrance of rain, wind or spray.

Still another object of the invention is to provide in the said combination seal means carried by the sliding hatch and slidably embracing the edge of the hatchway to provide a seal when the hatch cover is closed.

A still further object of the invention is to provide a unique type of seal arranged about the retractable windshield section, which in combination with a seal seat about the windshield opening, provides a seal against rain, wind and spray when the windshield is raised.

A general object of the invention is to provide a retractable hatch cover and windshield combination, which is simple and easy to operate, provides the maximum of head room through the windshield when retracted, and provides an effective slidable seal about the hatchway and windshield opening when in closed position.

Other and further objects of the invention will become apparent upon reading the detailed specification hereinafter following, and by referring to the drawings annexed hereto.

A suitable embodiment of the invention is shown in the attached drawings, wherein:

FIGURE I is a perspective view of the bow, front deck and windshield of a boat, showing the retractable hatch cover and windshield in retracted position, with the windshield open to provide a walkway therethrough;

FIGURE II is a transverse, cross-sectional view taken on the line II—II of FIGURE I;

FIGURE III is a longitudinal section taken along the line III—III of FIGURE I;

FIGURE IV is a view similar to FIGURE III, but showing the hatch and retractable windshield section as it would appear when partially retracted;

FIGURE V is a view similar to FIGURE III showing the windshield section in retracted position, but with the hatch cover closed;

FIGURE VI is a fragmentary, transverse cross-sectional view taken along the line VI—VI of FIGURE I; and FIGURE VII is a fragmentary, transverse vertical sectional view taken along the line VII—VII of FIGURE I.

Numeral references are employed to indicate the various parts shown in the drawings, and like numerals indicate like parts throughout the various figures of the drawings.

As shown in FIGURE I, the boat 3 has a forward deck 4 with a longitudinal, substantially rectangular hatchway 5 provided therein, and extending forwardly thereof.

An opening 6 is provided between the fixed windshield sections 7 and 8, which substantially coincides and communicates with the hatchway 5.

A sliding hatch cover 1 is slidably disposed to each side of the hatchway 5, and a retractable windshield section 2 is slidably attached to the inner sides of the hatchway 5 and the windshield opening 6, all in the manner as hereinafter described in detail.

It will thus be seen that there is provided a hatch cover 1 which may be slid longitudinally of the hatchway 5 to open and close same, and that a retractable windshield section 2 is provided which may be moved upwardly to close the passage 6, with the lower end thereof resting on the hatch cover 1, to thereby close the hatchway 5 and windshield opening 6, and may be moved downwardly to a position underneath the hatch cover 1.

The remainder of the boat 3 is of conventional design, having a cabin with fixed windshield sections 7 and 8 at the front thereof, and a top or canopy 9.

As shown in FIGURES II and VI, the track assembly 10 on each side of the hatchway 5 on which the hatch cover 1 and windshield section 2 are movably supported, comprises a unitary metallic strip having a downwardly extending portion 10, an upwardly extending portion 11 with a channel 11a provided therein, and an outwardly extending longitudinal lip or rib 14 on the outer side thereof.

The right angular flange 12, secured to the deck 4 at each side of the walkway 5, is positioned in the channel 11a and on the shoulder 21, formed on the track member 10, and is secured thereto by means of a plurality of spaced rivets 13 secured through the abutting members.

The sliding hatch cover 1 has a bearing and seal support extension 19 provided along each side thereof, which are formed to provide channels 19a on the inner sides thereof arranged to receive the bearing members 15 and seal strips 16, as will be hereinafter described.

The bearing members 15, which may be made of a flexible plastic composition, such as Teflon, are preferably positioned in the channels 19a adjacent the ends of the sliding hatch 1. The bearing members 15 may be sprung into place in the channels 19a, and retained therein by spring tension.

The bearing members 15 have flexible legs 15a and 15b thereon, which embrace the bearing lips 14 with a slight tension, so that the bearing members may slide along the lip 14 in response to the longitudinally exerted pressure against the hatch cover 1.

There is also disposed in the channels 19a, as shown in FIGURE VI, elongated flexible seal strips 16.

The seal strips 16 are made of a flexible seal material, such as rubber or synthetic rubber compound, and have legs or lips 16a and 16b thereon which slidably embrace the bearing ribs 14.

The seal strips 16 have cylindrical sections 17 on one edge thereof, which may be forced into the cylindrical channels 18 in the members 19. A lip 16c is also provided along the opposite edge of the seal member 16, which is arranged to be forced into a channel 19b along the lower edge of the channel 19a. Thereby the seal members 16 are retained in the channels 19a in slidable and sealing engagement with the bearing ribs 14.

The seal strips 16 extend longitudinally of the members in the space between the bearing members 15, and provide a seal between the members 19 and the ribs 14 to prevent rain, wind, and spray from entering the hatchway 5 when the cover is closed. Longitudinal parallel, opposed channels 22 are formed along the lower inner sides of the track members 10 on opposite sides of the opening 5, to receive and guide the rollers 28 carried by the retractable windshield section 2.

The retractable windshield assembly 2 includes a border 23, having a serrated channel 24 around the inner side thereof arranged to receive the edges of the glass 25.

The upper and lower edges of the border 23 have roller support brackets 26 extending right angularly therefrom to the outer edge of which are attached roller shafts 27, providing axles at each end thereof on which the plastic rollers 28 are rotatably mounted. The rollers 28 are preferably made of a plastic material, such as Teflon, which requires no lubrication. and are arranged to roll along the track channels 22 as the glass is slid along the hatchway 5 and upwardly into the opening 6 in the manner hereinafter described. Springs 28a are disposed between the ends of shafts 27 and inner side of rollers 28 to urge same outwardly.

Seal strips 29 are attached about the outer edges of the border 23 on all sides of the sliding windshield 2. The seal strips 29 have cylindrical extensions 30 thereon which may be forced into the cylindrical channels 31, provided on the border sections 23, to detachably secure the seal members 29 to said borders.

The seal members 29 are of special construction, each having a plurality of spaced parallel lips 32 thereon which are arranged to conform to the seal seat about the opening 6 when the windshield section 2 is raised, to provide an effective seal thereabout.

The lips 32 are arranged to seal when flexed in either direction, and are therefore easily conformable to the seal seat surface as the windshield is moved to upward position. Preferably the lips 32 either do not touch, or only lightly touch, the inner surfaces of the flanges 12 in order that frictional engagement will not prevent easy sliding movement of glass section 21 in hatch opening 5.

A seal seat and track assembly about the windshield opening 6 is shown in detail in FIGURE VII, and is indicated generally by numeral 33.

This assembly includes unitary, formed strips 34 on each side of the windshield opening 6, which have formed thereon an inner roller channel 35. The roller channels 35 connect with the roller channels 22 at the lower end, as shown in FIGURES III and IV, so that the roller channels 22 and 35 provide continuous connecting roller channels on each side of the hatch opening 5 and windshield openings 6, whereby the windshield may be moved on the rollers 28 upwardly and downwardly in the opening 6 and outwardly in the hatchway 5 to a position underneath the sliding hatch 1.

The strips 34 are also provided on their outer sides with a seal channel 36 in which a seal 36a of resilient material is disposed.

A seal support strip 37 is slidably disposed in a channel 38 formed on the outer side of the members 34. An outwardly extending lip 37a, forms a seal channel 39 with the outwardly extending lip 34a. A seal strip 40 is disposed in the channel 39 and sealingly and grippingly engages the edge of the fixed glass section 7 or 8.

Seal seats 41, which are preferably made of flexible plastic material, each has a lip 42 provided thereon, which engages with the channels 43 provided on the border elements 34. A lip 44 is provided on the other side of the seal seat members 41, which engages with a channel 45 provided on the inner side of the upward extensions of the border element 34. A seal seat 41 extends along each side of the windshield opening 6 each of which has a seal surface 46 thereon along the inner sides of the opening 6 against which the elastic flanges 32 of the seal strips 29 may be pressed to sealingly engage therewith, to thereby seal between the edges of the retractable windshield 2 and the opening 6 to prevent the entrance of wind and water.

An upstanding handle 47 is provided on the upper side of the inner end of the sliding hatch 1, which may be grasped for moving the sliding hatch 1 outwardly or inwardly of the hatchway 5.

There is provided along the upper surface of the handle 47 a seal channel 48 in which the seal 29 on the lower edge of the sliding windshield 2 may seat, and sealingly engage, to seal against the entrance of wind, rain and water along said surface.

A border 49 is provided along the upper inner side of the opening 6, said border including a downwardly extending lip 52, which overlaps the seal 29 when the retractable windshield 2 is in raised position, and allows the circulation thereabove of air. A perfect seal is not required, inasmuch as the overhang of the canopy or top 50 of the boat, and the downwardly extending element 53, prevents rains from entering about the upper edge of the sliding windshield assembly.

The operation and function of the device hereinbefore described is as follows:

Assuming that the windshield and hatch assembly are in closed position, as shown in FIGURE III, the windshield assembly 2 may be pushed upwardly slightly to disengage the seal 29 from the handle 47, whereupon the sliding hatch 1 may be slid outwardly away from the windshield. Simultaneously therewith the windshield assembly 2 may move downwardly either by gravity or by slight force exerted thereagainst, as the rollers 28 roll along the channels 35 and 22. By pushing outwardly on both the retractable hatch and the windshield assembly, the hatch 1 will move outwardly toward the outer end of the hatchway 5, as the windshield assembly 2 moves underneath the hatch to the position shown in FIGURE I.

To close the retractable windshield and hatch assembly, the windshield is first pulled upwardly as the rollers 28 move along the channels 22 and 35 to upward position as shown in FIGURE III. The hatch cover 1 is then slid inwardly until the handle 47 is underneath the seal 29 along the lower edge of the windshield assembly 2. The windshield assembly 2 is then released to allow the seal 29 to seat in the channel 48, thereby holding the glass up in sealing position. As the windshield assembly 2 moves upwardly, the flanges 32 of the seal members 29 on each side thereof, are depresesd and come into sealing contact with the sealing surfaces 46 on the seal seat members 41.

Should it be desired that the hatchway 5 be closed, but leave the windshield opening 6 open, the hatch cover 1 may be pulled inwardly as shown in FIGURE V, leaving the retractable windshield assembly 2 thereunder.

It will be understood that other and further embodiments of the invention may be devised without departing from the spirit and scope of the appended claims.

Having described my invention, I claim:

1. In combination with a boat having a forward deck; a rectangular opening in the deck; spaced fixed windshield sections extending angularly up from the deck at the end of the opening, providing a substantially rectangular passage therebetween angularly disposed to, and communicating with, the opening in the deck; a cover having portions along each edge thereof overlapping the rectangular opening; longitudinal ribs extending along the outer sides of the opening; slidable seal members carried by the overlapping portions of the cover, slidably and sealingly engaging the ribs; parallel longitudinal channels extending along the inner sides of the opening in the deck arranged in spaced relationship to the upper edges thereof; parallel channels extending along the inner sides of the passage between the fixed windshield sections communicating with the channels along the inner sides of the deck opening; a retractable windshield section; rollers carried at each end of the retractable windshield section in spaced angular relationship thereto, said rollers being arranged to roll along said channels at the inner sides of the deck opening and along the channels on each side of the passage between the fixed windshield sections; and seal elements attached to the edges of the retractable windshield section arranged to sealingly engage the inner sides of the passage between the fixed windshield sections; the top of the cover being sufficiently spaced above the channels along the inner sides of the opening in the deck to allow said retractable windshield section to move underneath the cover when moved to downward position.

2. The combination called for in claim 1 with the addition of spaced bearing members carried by the overlapping portions of the cover having portions slidably engaging the longitudinal ribs.

3. The combination called for in claim 2 with the addition of a transverse member attached on the upper side of the inner end of the cover, having a channel on the upper surface thereof, arranged to receive the lower edge of the retractable windshield section when the hatch is in inward position, and the windshield section is in upward position.

4. The combination called for in claim 2 wherein the seal elements extending about the retractable windshield section includes a plurality of parallel spaced lips extending longitudinally on the outer side thereof; and flat seal seats extending along the inner sides of the opening between the fixed windshild sections, to sealingly receive said lips.

5. In combination with a boat, having an upwardly extending windshield with a deck extending forwardly thereof; a hatchway in the deck extending forwardly of the windshield; an upwardly extending opening in the windshield communicating with, and substantially corresponding to the width of the hatchway; oppositely disposed parallel channels extending along the inner side of the hatchway; oppositely disposed parallel channels extending along the inner side of the windshield opening; the channels on the inner sides of the hatchway and on the inner sides of the windshield opening intersecting each other at the intersection of the inner end of the hatchway with the lower end of the windshield opening to provide continuous oppositely disposed parallel channels along the inner side of the windshield opening and the hatchway; a retractable windshield section; guide means on the opposite edges of the windshield section extending into the channels and being slidably disposed therein; a hatch cover; the top of the hatch cover being spaced above the channels on the inner side of the hatchway sufficiently to allow the windshield section to be retracted thereunder, whereby the windshield section may be moved upwardly to close the windshield opening and may be moved downwardly in the hatchway to a position underneath the hatch cover.

6. The combination called for in claim 5 with the addition of a portion of the inner end of the hatch cover arranged to extend underneath the lower edge of the windshield section when the windshield section is in upward position to hold the windshield section in upward position.

7. The combination called for in claim 5 with the addition of seal means arranged about the outer edge of the retractable windshield section arranged to slidably seal along the inner sides of the windshield opening; and seal means on the outer edges of the hatch cover arranged to slidably seal along the edges of the hatchway.

References Cited in the file of this patent

UNITED STATES PATENTS

| | | |
|---|---|---|
| 989,702 | Gurney | Apr. 18, 1911 |
| 2,836,140 | Hunt | May 27, 1958 |